(12) United States Patent
Wu

(10) Patent No.: US 9,420,504 B2
(45) Date of Patent: *Aug. 16, 2016

(54) METHOD OF HANDLING CELL CHANGE AND RELATED APPARATUS

(71) Applicant: HTC Corporation, Taoyuan County (TW)

(72) Inventor: Chih-Hsiang Wu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/543,861

(22) Filed: Nov. 17, 2014

(65) Prior Publication Data

US 2015/0072689 A1    Mar. 12, 2015

Related U.S. Application Data

(63) Continuation of application No. 12/400,754, filed on Mar. 9, 2009.

(60) Provisional application No. 61/146,662, filed on Jan. 23, 2009.

(51) Int. Cl.
*H04W 36/00* (2009.01)
*H04W 36/14* (2009.01)
(Continued)

(52) U.S. Cl.
CPC .......... *H04W 36/0066* (2013.01); *H04W 36/14* (2013.01); *H04W 48/02* (2013.01); *H04W 48/20* (2013.01)

(58) Field of Classification Search
CPC ... H04W 84/045; H04W 76/02; H04W 92/02; H04W 8/04; H04W 76/027; H04W 28/18; H04W 88/08; H04W 88/12; H04W 16/32; H04W 48/08; H04W 48/20; H04W 48/02; H04W 76/046; H04W 76/06; H04L 43/0811
See application file for complete search history.

(56) References Cited

U.S. PATENT DOCUMENTS 7,133,383 B2   11/2006   Dalsgaard
7,433,698 B2   10/2008   Marjelund
(Continued)

FOREIGN PATENT DOCUMENTS

CN   1722902 A   1/2006

OTHER PUBLICATIONS

3GPP TS 25.331 v 6.9.0 (Mar. 2006) Release 6.*
(Continued)

*Primary Examiner* — Nizar Sivji
(74) *Attorney, Agent, or Firm* — Winston Hsu; Scott Margo

(57) ABSTRACT

A method of handling cell change for a mobile device is disclosed. The method comprises receiving a cell change order message from a source cell of a first radio access technology (RAT), in response to the receiving, performing a cell change order procedure from the source cell of the a first RAT to a target cell of a second RAT, performing a RRC, an abbreviation of radio resource control, connection establishment procedure to the target cell of the second RAT, receiving system information including access barring information of the target cell of the second radio access technology from the target cell of the second radio access technology, determining access barring according to the access barring information, and determining that the cell change order procedure is failed when the RRC connection establishment procedure is failed due to the access barring.

8 Claims, 5 Drawing Sheets

(51) Int. Cl.
*H04W 48/02* (2009.01)
*H04W 48/20* (2009.01)

(56) References Cited

U.S. PATENT DOCUMENTS

| | | |
|---|---|---|
| 2006/0034204 A1 | 2/2006 | Lee |
| 2008/0200173 A1 | 8/2008 | Dalsgaard |
| 2010/0240367 A1 | 9/2010 | Lee |
| 2011/0053597 A1 | 3/2011 | Lee |

OTHER PUBLICATIONS

3GPP, 3GPP TS 36.300 v8.7.0, 10.1.5.1 Contention based random access procedure, Dec. 2008.
3GPP, 3GPP TS 36.321 v8.4.0, 5.1.5 Contention Resolution, Dec. 2008.
3GPP, 3GPP TS 36.331 v8.4.0, 5.4.6, Inter-RAT cell change order to E-UTRAN, Dec. 2008.
3GPP, 3GPP TS 44.060 v8.3.0., 8.4 Network controlled cell reselection procedure, Dec. 2008.
3rd Generation Partnership Project; Technical Specification Group Radio Access Network; Evolved Universal Terrestrial Radio Access (E-UTRA) Radio Resource Control (RRC); Protocol specification (Release 8), 3GPP TS 36.331 V8.4.0 (Dec. 2008), front page + pp. 2-197, XP-050377647, Sophia Antipolis Valbonne-France.
Digital cellular telecommunications system (Phase 2+); General Packet Radio Service (GPRS); Mobile Station (MS)-Base Station System (BSS) interface; Radio Link Control/Medium Access Control (RLC/MAC) protocol (3GPP TS 44.060 version 8.3.0 Release 8), ETSI TS 144 060 V8.3.0 (Jan. 2009), front page + pp. 84-85, 137-139, 535-543, Sections 7.4.1, 7.4.2, 8.4, 8.4.1, 8.4.2 and 13.1., XP050378748, Sophia Antipolis Cedex, France.
Universal Mobile Telecommunications System (UMTS); Radio Resource Control (RRC); Protocol specification (3GPP TS 25.331 version 8.4.0 Release 8), ETSI TS 125 331 V8.4.0, (Oct. 2008), front page + pp. 248-250, 656, 1286-1287, Sections 8.3.11.3-8.3.11.5, 10.3.3.50 and 13.1.,XP014042529, Sophia Antipolis Cedex, France.
3rd Generation Partnership Project; Technical Specification Group GSM/EDGE Radio Access Network; General Packet Radio Service (GPRS); Mobile Station (MS)-Base Station System (BSS) interface; Radio Link Control/Medium Access Control (RLC/MAC) protocol (Release 8), 3GPP TS 44.060 V8.3.0 (Dec. 2008), front page + pp. 2-574, XP-050378748, Sophia Antipolis Valbonne-France.
"GPRS in Practice : A Companion to the Specifications," Peter McGuiggan, Sep. 3, 2004, RLC/MAC Layer Procedures,ISBN-13: 978-0470095072, p. 243.

\* cited by examiner

METHOD OF HANDLING CELL CHANGE AND RELATED APPARATUS

CROSS REFERENCE TO RELATED APPLICATIONS

This application is a continuation of U.S. application Ser. No. 12/400,754 filed on Mar. 9, 2009, which claims the benefit of U.S. Provisional Application No. 61/146,662 filed on Jan. 23, 2009.

BACKGROUND OF THE INVENTION

1. Field of the Invention

The present invention relates to a method utilized in a wireless communication and communication device thereof, and more particularly, to a method for improving a cell change mechanism in a wireless communication system and communication device thereof.

2. Description of the Prior Art

Inter-radio-access-technology (Inter-RAT) mobility involves transfer of a connection between a mobile device and a network from one RAT to another RAT. Inter-RAT transfer may occur due to handover or cell reselection. In the case of the cell reselection, the UE transfer a connection between cells using different RATs, such as GSM (Global System for Mobile communications)/EDEG (Enhanced Data Rates for GSM Evolution), UMTS (Universal Mobile Telecommunications System), and LTE (Long-term evolution).

A cell change order procedure from a GERAN cell, as network controlled cell reselection, is initiated via a PACKET CELL CHANGE ORDER message including information of the target cell. A cell change order procedure from a GERAN cell, as network controlled cell reselection, is initiated via a PACKET CELL CHANGE ORDER message including information of the target cell. Upon reception of the PACKET CELL CHANGE ORDER message, the UE starts a timer T3174 and selects the target cell to establish a connection. If the timer T3174 expires prior to successful RRC connection establishment, the cell change order procedure is failed and the MS returns to the GERAN cell. In addition, the cell change order procedure is also failed when access to the target cell is denied (i.e., the MS receives an IMMEDIATE ASSIGNMENT REJECT, a PACKET ASSIGNMENT REJECT or, in a UTRAN cell, an RRC CONNECTION REJECT message).

A cell change order procedure from a UMTS (UTRAN) cell is initiated via a CELL CHANGE ORDER FROM UTRAN message including information of the target cell. Upon reception of the CELL CHANGE ORDER FROM UTRAN message, the MS starts a timer T309 and selects the target cell to establish a RRC connection. If the timer T309 expires prior to successful RRC connection establishment, the cell change order procedure is failed and the MS returns to the UMTS cell. In addition, the cell change order procedure is also failed when access to the target cell is denied. As can be seen from the above, the timers T3174 and T309 provide a period of validity for corresponding cell change order procedure.

In a cell change order procedure from other RAT (e.g. GSM/UMTS) to a LTE cell, or an E-UTRA (Evolved UMTS Terrestrial Radio Access) cell, the UE enters the LTE cell with an RRC_IDlE state and then performs a random access procedure for uplink synchronization with an eNB (evolved Node-B) of the LTE cell and for the RRC connection establishment procedure. The random access procedure shall be well known and corresponding details are omitted. If the cell change order procedure is failed, the UE returns to the source cell. The LTE system employs several timers for access barring. A timer T302 is used for barring RRC connections related to mobile originating/terminating calls or mobile originating signaling; a timer T303 is used for barring the RRC connections related to the mobile originating calls; a timer T305 is used for barring the RRC connections related to the mobile originating signaling. In the RRC connection establishment procedure, a LTE cell in a barred state rejects a RRC connection request by sending a RRC CONNECTION REJECT message. In this situation, the UE needs to set the timer T302 to a wait time included in the RRC CONNECTION REJECT message. In other words, the access barring can be reflected by the timer T302.

Due to unclear specification for the cell change order procedure to the LTE cell, the UE encounters four scenarios described as follows.

In the first scenario, the UE receives a cell change order when performing data transmission (e.g. when staying in a packet transfer mode of GERAN system), and thereby tries to establish a RRC connection with the target LTE cell as soon as possible. However, the target LTE cell is barred temporally due to access barring for mobile originating calls or mobile originating signaling. The access barring time is so long that the UE encounters a huge delay of data transmission after the cell change. Continuity/Quality of the in-use service is affected.

In the second scenario, a UE in a GERAN (GSM/EDEG Radio Access Network) cell in a packet transfer mode receives the PACKET CELL CHANGE ORDER message for cell change to an E-UTRA cell. The UE starts timer T3174 that is set to 15 seconds. The UE selects the E-UTRA cell and performs a random access procedure for sending a RRC CONNECTION REQUEST message. The UE successfully completes the contention resolution, i.e. the UE detects a Temporary C-RNTI (assigned in a Random Access Response) and finds corresponding UE Contention Resolution Identity in a received packet. The UE regards the cell change order procedure as successful and stops the timer T3174. However, the E-UTRA cell responds a RRC CONNECTION REJECT message including a wait time whose range is from 1 to 16 seconds. The UE starts the timer T302 set to the wait time value that is set to 8 seconds. The UE is not allowed to access the E-UTRA cell before the timer T302 expires. When the timer T302 expires, the UE perform the RRC connection establishment procedure again. The UE does not get the access permission from the E-UTRA cell due to another receipt of the RRC CONNECTION REJECT message including another wait time that is set to 10 seconds. Due to a barred state of the E-UTRAN, the wait times can be set to a so larger number that the total wait time (18 s) exceeds a time limit (15 s) of the timer T3174. This delays the UE access for data transmission.

In the third scenario, a UE in a GERAN cell in the packet transfer mode receives a PACKET CELL CHANGE ORDER message for cell change to an E-UTRA cell. The UE starts a timer T3174 that is set to 15 seconds. The UE selects the E-UTRA cell and performs a random access procedure for sending a RRC CONNECTION REQUEST message. The E-UTRA cell responds a RRC CONNECTION REJECT message including a wait time that is set to 2 seconds, indicating failure of the network controlled cell reselection. However, the wait time herein is so short that the UE can re-send the RRC CONNECTION REQUEST message soon. If the UE returns to the old cell according to the abovementioned description, the UE loses the chance to get a better data rate from the E-UTRA.

In the fourth scenario, a UE in the GERAN cell in the packet transfer mode receives a PACKET CELL CHANGE ORDER message for cell change to an E-UTRA cell. The UE starts timer T3174 that is set to 15 seconds and selects the E-UTRA cell to send a RRC CONNECTION REQUEST message. If the E-UTRA cell is in the barred state, the UE starts the timers T303 or T305 when accessing to the E-UTRA cell. In this situation, the UE cannot perform a random access procedure due to access barring of mobile originating calls (T303) or mobile originating signaling (T305). If T303 or T305 is larger than 15 seconds, the UE cannot access the E-UTRA cell before the timer T3174 expires. This means that the cell change procedure is inevitably failed if the T303 or T305 value is larger than the T3174 value. After T3174 expires, the UE returns to the GERAN cell and sends a PACKET CELL CHANGE ORDER FAILURE message. In the abovementioned situation, it is not necessary for the UE to wait for the T3174 expiry because access to E-UTRA keeps being prohibited during the running of the T3174.

In the prior art, the cell change order procedure is only considered failed when an access denying message (e.g. an IMMEDIATE ASSIGNMENT REJECT message) is received without consideration of the access barring time of the target cell, resulting in the long delay of UE data transmission.

SUMMARY OF THE INVENTION

Therefore, the present invention provides a method of handling an inter-RAT cell change and related communication device to avoid the abovementioned problems.

According to one aspect of the present invention, a method of handling cell change for a mobile device comprises receiving a cell change order message from a source cell of a first radio access technology (RAT), in response to the receiving, performing a cell change order procedure from the source cell of the a first RAT to a target cell of a second RAT, performing a RRC, an abbreviation of radio resource control, connection establishment procedure to the target cell of the second RAT, receiving system information including access barring information of the target cell of the second radio access technology from the target cell of the second radio access technology, determining access barring according to the access barring information, and determining that the cell change order procedure is failed when the RRC connection establishment procedure is failed due to the access barring.

According to another aspect of the present invention, a communication device for appropriately handling cell change comprises a storage device for storing program code corresponding to a process, and a processor coupled to the storage device, for processing the program code to execute the process, wherein the process comprises receiving a cell change order message from a source cell of a first radio access technology (RAT), in response to the receiving, performing a cell change order procedure from the source cell of the first RAT to a target cell of a second RAT, performing a RRC, an abbreviation of radio resource control, connection establishment procedure to the target cell of the second RAT, receiving system information including access barring information of the target cell of the second radio access technology from the target cell of the second radio access technology, determining access barring according to the access barring information, and determining that the cell change order procedure is failed when the RRC connection establishment procedure is failed due to the access barring.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
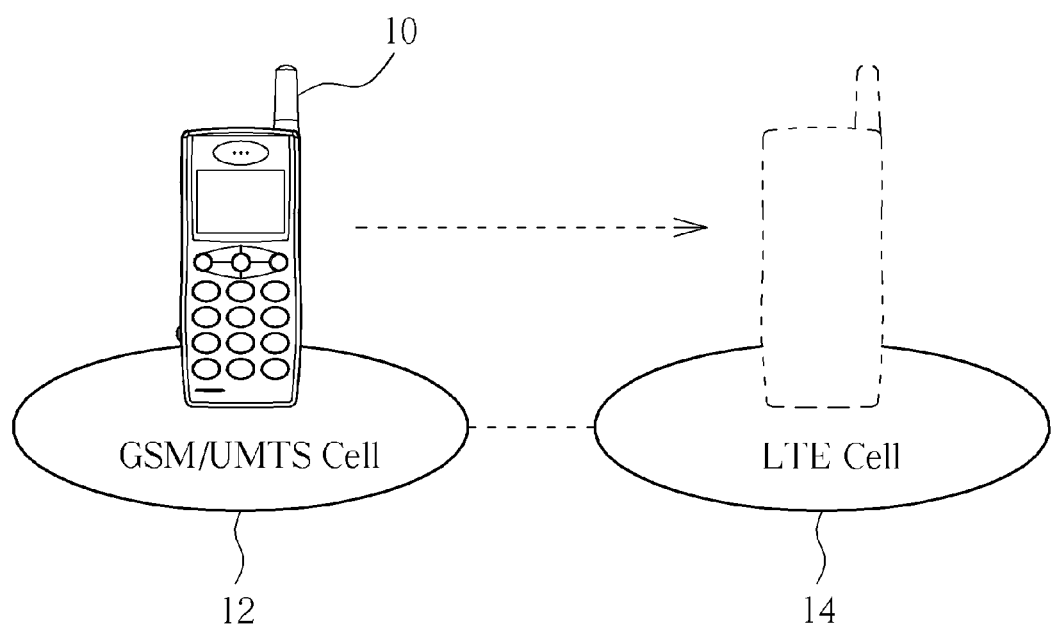
FIG. 1 is a schematic diagram of a cell change in a wireless communication system.

Please refer to FIG. 1, which illustrates a schematic diagram of a cell change. In FIG. 1, a cell 12 serving a mobile device 10 and a cell 14 supports different radio access technologies (RATs), and the mobile device 10 supports the RATs. The cell 12 supports a UMTS (Universal Mobile Telecommunications System) RAT or a GSM/GERAN (GSM/EDEG Radio Access Network) RAT, and thereby can be controlled by an NB (Node B) or abase station, respectively. The cell 14 supports a LTE (long-term evolution) RAT and thereby can be controlled by an eNB (evolved-Node B) providing a radio interface with the UE. The mobile device 10 are referred as a user equipment (UEs) or a mobile station (MS), supporting the abovementioned RATs, and can be a device such as a mobile phone, a computer system, etc. The mobile device 10 normally measures the communication quality, such as quality of a channel/a frequency layer or strength of a received radio signal, and thereby generates measurement reports. The cell 12 can send a cell change order assigning the cell 14 to the mobile device 10 for initiation of a cell change order procedure when the measurement reports indicate bad communication quality. For the cell change, the cells 12 and 14 are regarded as a source cell and a target cell respectively. The cell change order is a PACKET CELL CHANGE ORDER message when the cell 12 is a GSM/GERAN cell, or is CELL CHANGE ORDER FROM UTRAN message when the cell 12 is a UMTS cell. The mobile device 10 performs a cell change order procedure to access the cell 14 when receiving the cell change order. Normally, the mobile device 10 performs a random access procedure for uplink synchronization and for a RRC (radio resource control) connection establishment when selecting the cell 14. In addition, the mobile device 10 starts a timer providing a period of validity for the cell change order procedure when starting to perform the cell change order procedure. The timer is T3174 when the cell 12 is a GSM/GERAN cell or is T309 when the cell 12 is a UMTS cell. The mobile device 10 stops the timer and determines that the cell change order procedure is complete when receiving a RRC CONNECTION SETUP message as a successful response from the target cell. When the timer (T3174 or T309) expires before the success of the RRC connection establishment procedure, the mobile device 10 returns to the cell 12. In addition, the cell 14 can perform access barring for a mobile originating call, a mobile terminating call, mobile originating signaling or a cell change order for the mobile device 10. For the access barring of the cell 14, a returning condition is established in the mobile device 10 which determines that the cell change order procedure is failed when the returning condition is conformed.

When the mobile device 10 conforms to the returning condition, this means that the cell change order procedure is failed due to the access barring of the cell 14. The mobile device 10 can then return to (reselect) the cell 12 and sends a cell change order failure message to the cell 12. The sent cell change order failure message includes failure information that indicates that the failure of the cell change order procedure is caused by the access barring of the cell 14. The failure information can further include an access barring time, based on which a base station controlling the cell 12 can determine when/whether to trigger another cell change order procedure for the mobile device 10. The base station can send the cell change order message (e.g. PACKET CELL CHANGE ORDER/CELL CHANGE ORDER FROM UTRAN message) to the mobile device 10 again after the access barring time elapses. The mobile device 10 accordingly re-performs the cell change order procedure.

Figure 2:
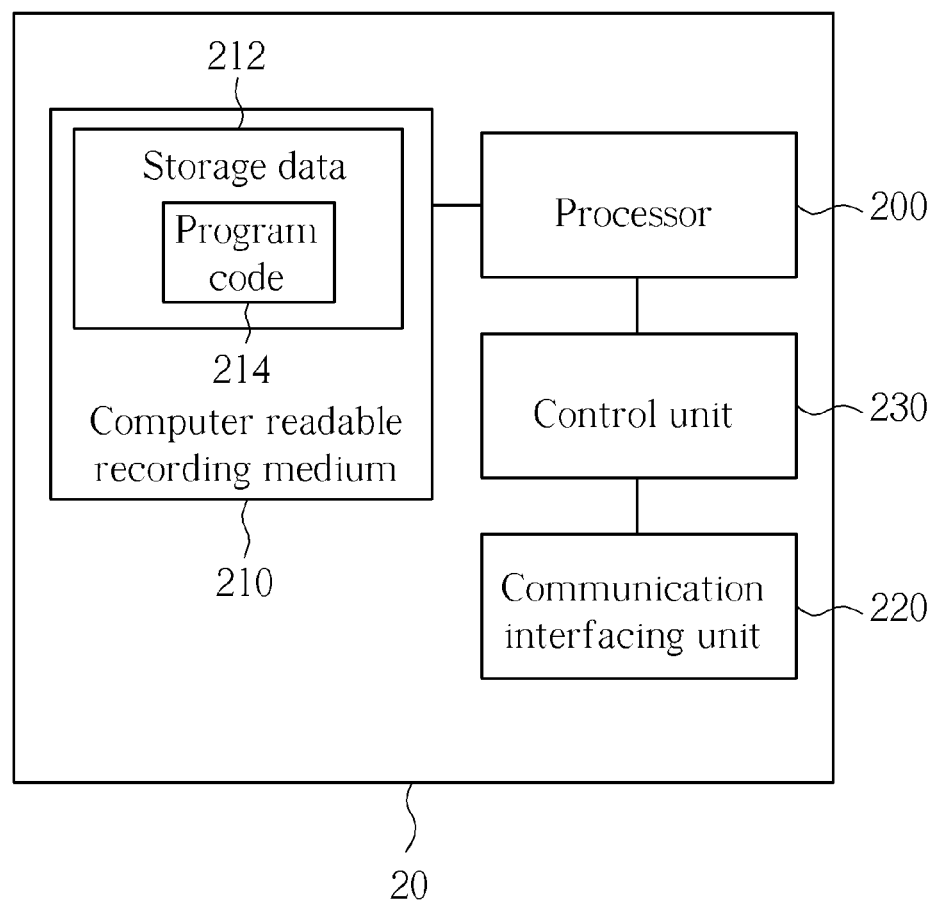
FIG. 2 is a schematic diagram of a communication device according to an embodiment of the present invention.

Please refer to FIG. 2, which illustrates a schematic diagram of a communication device 20 according to an embodiment of the present invention. The communication device 20 can be the mobile device 10, supporting the LTE, UMTS, GSM, and GERAN Iu mode systems, and includes a processor 200, a computer readable recording medium 210, a communication interfacing unit 220 and a control unit 230. The computer readable recording medium 210 is any data storage device that includes program code 214, thereafter read and processed by the processor 200. Examples of the computer readable recording medium 210 include a subscriber identity module (SIM), a universal subscriber identity module (USIM), read-only memory (ROM), random-access memory (RAM), CD-ROMs, magnetic tapes, hard disks, optical data storage devices, and carrier waves (such as data transmission through the Internet). The control unit 230 controls the communication interfacing unit 220 and related operations and states of the communication device 20 according to processing results of the processor 200. The communication interfacing unit 220 is preferably a radio transceiver and accordingly exchanges wireless signals with a network terminal, e.g. a NB.

The abovementioned returning condition is established according to reception of a message indicating the access barring of the target cell in a pure-packet-switched radio access technology (e.g. the LTE RAT), a wait time indicating the access barring of the target cell, or a timer for counting an access barring of the target cell.

Figure 3:
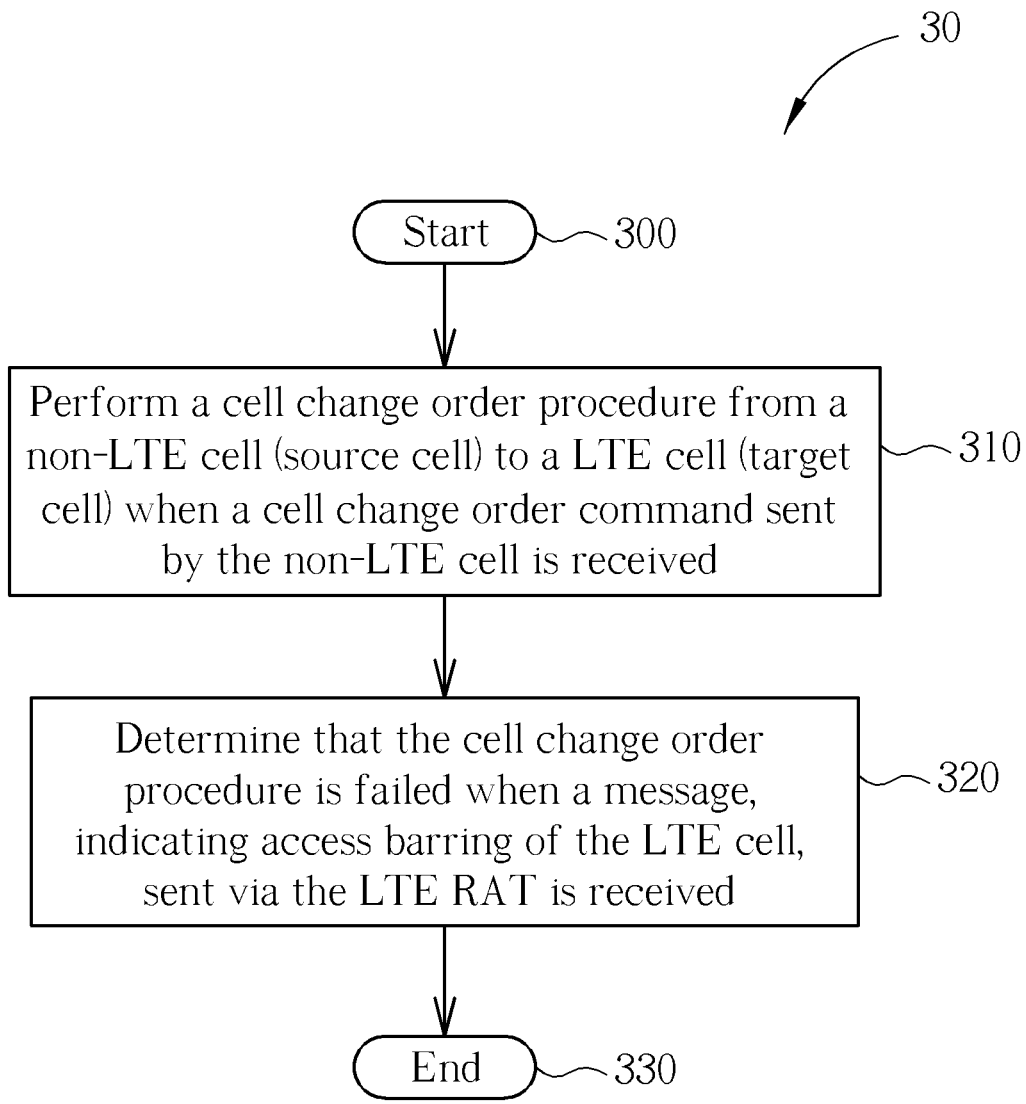
FIG. 3 is a flowchart of a process according to a first embodiment of the present invention.

Please refer to FIG. 3, which illustrates a flowchart of a process 30 according to a first embodiment of the present invention. The process 30 is utilized in a UE (or a MS) for handling a cell change where the returning condition is associated with the message reception. The process 30 can be compiled into the program code 214 and includes the following steps:

Step 300: Start.

Step 310: Perform a cell change order procedure from a non-LTE cell (source cell) to a LTE cell (target cell) when a cell change order command sent by the non-LTE cell is received.

Step 320: Determine that the cell change order procedure is failed when a message, indicating access barring of the LTE cell, sent via the LTE RAT is received.

Step 330: End.

According to the process 30, the UE performs the cell change order procedure to select the LTE cell, and then determines that the cell change order procedure is failed when receiving the message. Furthermore, the UE performs a random access procedure for a RRC connection establishment procedure after selecting the LTE cell which rejects any RRC connections if having the access barring. In this situation, the message via the LTE RAT is a RRC CONNECTION REJECT message indicating failure of the RRC connection establishment procedure. In other words, the UE determines that the cell change order procedure is failed, if the RRC connection establishment procedure performed via the LTE RAT is failed due to the access barring. That is, the UE does not re-perform the RRC connection establishment procedure in the cell change order procedure.

The random access procedure includes contention for an early random access of the LTE cell with other UEs. In addition, the non-LTE cell can be a GSM/GERAN/UMTS cell, and the UE can start a timer T3174/T309. The UE keeps the running of the timer T3174/T309 when winning a contention resolution for the random access procedure, and stops the timer T3174/T309 when the RRC connection establishment procedure is failed due to the access barring. The UE can also start a timer for the access barring, which can be T302, T303 or T305. When the timer expires or stops, access barring alleviation is informed to an upper layer of the UE, such as an application layer or a non-access stratum layer.

Furthermore, the UE returns to the non-LTE cell after determining that the cell change order procedure is failed, and performs steps as what the mobile device 10 performs after returning to the cell 12. With the process 30 and the failure information for the non-LTE cell, the UE neither undergoes a large delay for data transmission caused by failure of the reception of the message indicating access barring of the LTE cell nor a ping-pong situation that the UE is commanded to perform cell change order procedure several times but always unsuccessfully due to the access barring.

For example, the UE receives a cell change order when performing data transmission (e.g. when staying in a packet transfer mode of GERAN system), and thereby tries to establish a RRC connection with the target LTE cell that is barred as soon as possible. According to the concept of the process 30, the UE determines that the cell change order is failed when the UE is indicated the access barring by the LTE cell. Then the UE returns to the old cell and resumes data transmission in the old cell. The data transmission delay problem is avoided. Besides, a ping-pong situation that the UE is commanded to perform cell change order procedure several times but not successful due to access barring is also avoided. Therefore, continuity/Quality of the in-use service is improved.

Figure 4:
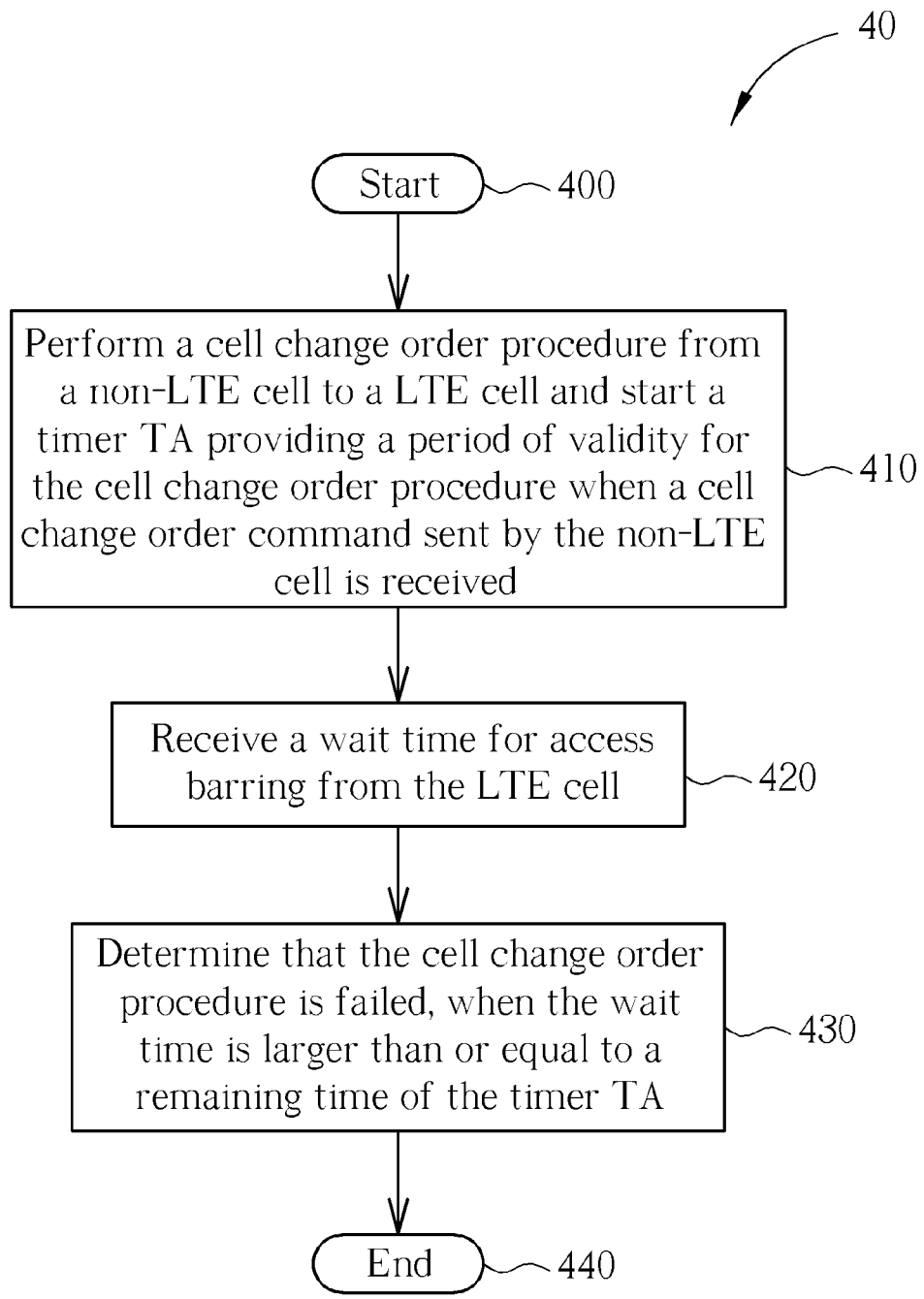
FIG. 4 is a flowchart of a process according to a second embodiment of the present invention.

Please refer to FIG. 4, which illustrates a flowchart of a process 40 according to a second embodiment of the present invention. The process 40 is utilized in a UE (or a MS) for handling a cell change where the returning condition is associated with a wait time state. The process 40 can be compiled into the program code 214 and includes the following steps:

Step 400: Start.

Step 410: Perform a cell change order procedure from a non-LTE cell to a LTE cell and start a timer TA providing a period of validity for the cell change order procedure when a cell change order command sent by the non-LTE cell is received.

Step 420: Receive a wait time for access barring from the LTE cell.

Step 430: Determine that the cell change order procedure is failed, when the wait time is larger than or equal to a remaining time of the timer TA.

Step 440: End.

According to the process 40, the UE determines that the cell change order procedure is failed, when the wait time received from the LTE cell is larger than or equal to the remaining time of the timer TA. On the contrary, the UE determining that the cell change order procedure is still valid, when the wait time is smaller than the remaining time of the timer TA. In addition, the UE can starts a timer TB set to the wait time when receiving the wait time. Preferably, the timer TA is T3174/T309; the timer TB is T302.

The wait time can be included in a RRC CONNECTION REJECT message of a RRC establishment procedure performed between the UE and the LTE cell. In this situation, after the cell change order procedure is determined to be still valid, the UE performs another RRC connection establishment procedure when the timer TB expires. If receiving another wait time during the second RRC connection establishment procedure, the UE performs value comparison of the newly-received wait time and the current remaining time of the timer TA again. The value comparison and determination for the wait time is continuously repeated until the UE determines that the cell change order procedure is failed or successfully establishes a RRC connection with the LTE cell.

When the wait time is larger than or equal to the remaining time of the timer TA, this means that an access barring period of the LTE cell is longer than the period of validity for the cell change order procedure. That is, the cell change order procedure must be determined to be failed due to expiry of the timer TA early than due to expiry of the wait timer. In this situation, the UE utilizes the process 40 to timely determine that the cell change order procedure is failed, without a waiting of the expiry of the timer TA or the wait timer. The UE can return to the non-LTE cell after the failure of the cell change order procedure is determined. Therefore, a large transmission delay of the UE can be avoided.

With the received wait time smaller than the remaining time of the timer TA, the UE has another chance to access the LTE cell for better communication service quality, e.g. a higher peak data rate.

For example, a UE in a GERAN (GSM/EDEG Radio Access Network) cell in a packet transfer mode receives the PACKET CELL CHANGE ORDER message for cell change to an LTE cell. The UE starts timer T3174 that is set to 15 seconds. The UE selects the LTE cell and performs a random access procedure for sending a RRC CONNECTION REQUEST message. The RRC CONNECTION REJECT message is received due to access barring of the LTE cell, and thereby the UE starts the timer T302 with a value set to a wait time. Assume the time between reception of PACKET CELL CHANGE ORDER and RRC CONNECTION REJECT messages is neglected. If the wait time is 16 or 15 seconds larger than or equal to the timer T3174, the UE determines that the cell change order procedure is failed and thereby returns to the GERAN cell. After the GERAN cell is selected, the UE sends a PACKET CELL CHANGE ORDER FAILURE message to notify the failure of the cell change order procedure. If the wait time is smaller than 15 seconds, the UE performs the RRC connection establishment procedure again after the timer T302 expires. In the newly RRC connection establishment procedure, if another RRC CONNECTION REJECT message including another wait time is received, the UE determines whether the cell change order procedure is failed, according to the newly-received wait time. Assuming that a remaining time of timer T3174 is 10 s, the UE determines that the cell change order procedure is failed if the newly-received wait time is given between 10-16 seconds, otherwise the UE performs the third RRC connection establishment procedure for better communication service quality. With comparison of the wait time and the timer T3174, a delay of data transmission can be reduced.

Figure 5:
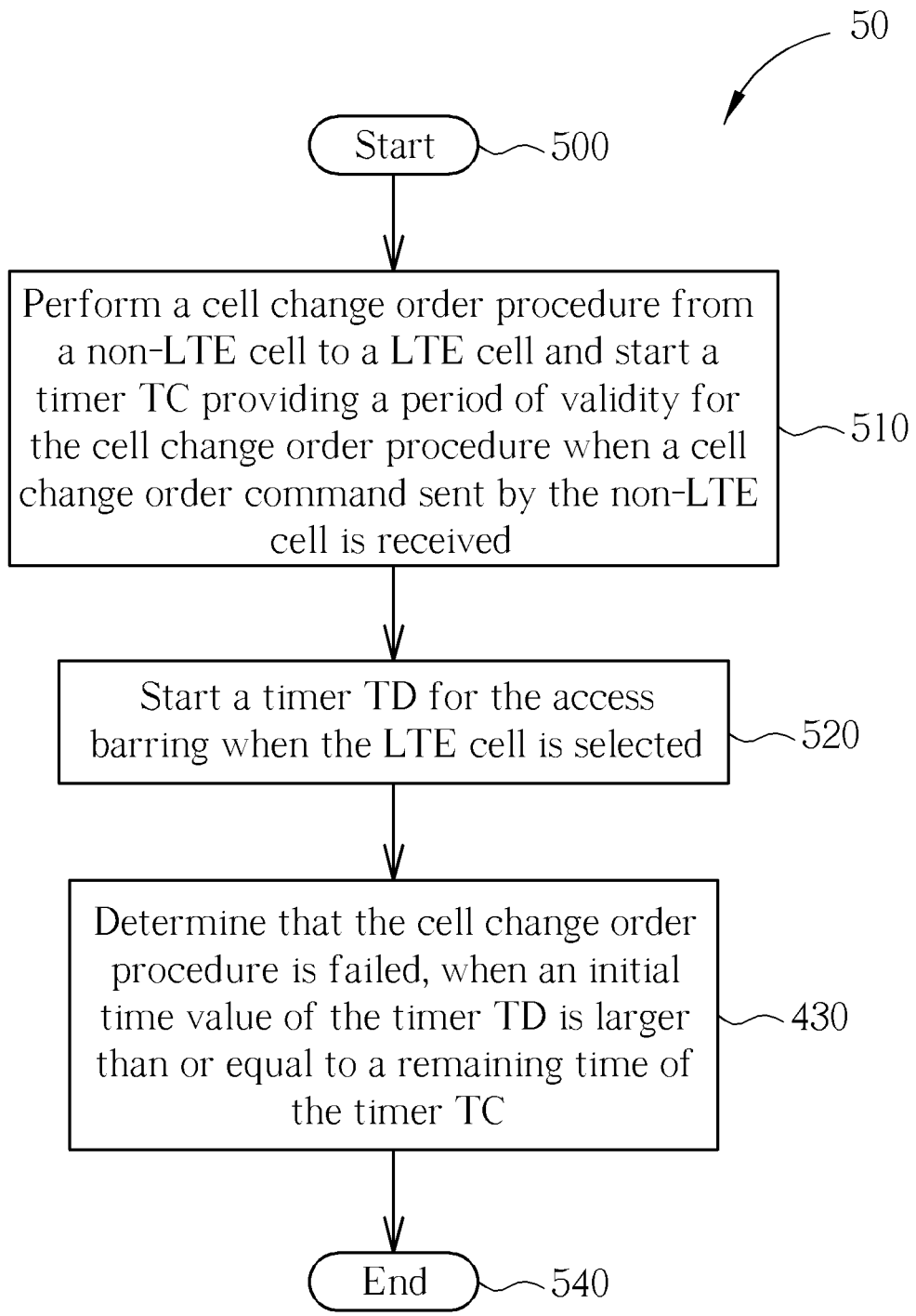
FIG. 5 is a flowchart of a process according to a third embodiment of the present invention.

Please refer to FIG. 5, which illustrates a flowchart of a process 50 according to a third embodiment of the present invention. The process 50 is utilized in a UE (or a MS) for handling a cell change where the returning condition is associated with an access barring timer. The process 50 can be compiled into the program code 214 and includes the following steps:

Step 500: Start.

Step 510: Perform a cell change order procedure from a non-LTE cell to a LTE cell and start a timer TC providing a period of validity for the cell change order procedure when a cell change order command sent by the non-LTE cell is received.

Step 520: Start a timer TD for the access barring when the LTE cell is selected.

Step 530: Determine that the cell change order procedure is failed, when an initial time value of the timer TD is larger than or equal to a remaining time of the timer TC.

Step 540: End.

According to the process 50, the UE applies the timer TC for period of validity for the cell change order procedure and the timer TD for the access barring of the LTE cell, and determines that the cell change order procedure is failed, when the initial time value of the timer TD is larger than or equal to the remaining time of the timer TC. A timer TD whose initial time value is larger than or equal to the remaining time of the timer TC implies that an access barring period of the LTE cell is longer than the period of validity for the cell change order procedure. Thus, the cell change order procedure is certainly failed. In this situation, the UE, through the process 50, can timely determine that the cell change order procedure is failed. The UE can return to the non-LTE cell after determining that the cell change order procedure is failed. Therefore, a large transmission delay of the UE can be avoided.

In addition, the UE determines that the cell change order procedure is still valid when the initial time value is smaller than the remaining time of the timer TC. After this, the UE can perform a RRC connection establishment procedure or a random access procedure when the timer TD expires.

Preferably, the timer TD is T302, T303 or T305; the timer TC is T3174/T309. When the T302 is used as the timer TD, the initial time value of the T302 can be set to a wait time included in a RRC CONNECTION REJECT message of a RRC establishment procedure performed between the UE and the LTE cell.

In conclusion, the embodiments of the present invention provides ways for the UE to determine whether cell change order procedure is failed according to reception of an access barring indicating message, the wait time, or a separate timer, thereby reducing a long delay of UE data transmission.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling cell change for a mobile device, the method comprising:
   receiving a cell change order message from a source cell of a first radio access technology (RAT);
   in response to the receiving, performing a cell change order procedure from the source cell of the a first RAT to a target cell of a second RAT;
   performing a radio resource control (RRC) connection establishment procedure when selecting the target cell of the second RAT;

receiving system information including access barring information of the target cell of the second radio access technology, from the target cell of the second radio access technology, wherein the access barring information indicates that the RRC connection establishment procedure is barred;

determining access barring according to the access barring information;

determining that the cell change order procedure is failed when the target cell of the second RAT is selected and the RRC connection establishment procedure is failed due to the access barring;

selecting to the source cell after determining that the cell change order procedure is failed; and sending a cell change order failure message to the source cell.

2. The method of claim 1 further comprising determining that the cell change order is failed when the RRC CONNECTION REJECT message of the RRC connection establishment procedure is received.

3. The method of claim 1, wherein cell change order failure message includes failure information indicating that the failure of the cell change order procedure is caused by the access barring.

4. The method of claim 1 further comprising determining that the cell change order procedure is complete when a RRC CONNECTION SETUP message from the target cell is received.

5. A communication device for appropriately handling cell change, the communication device comprising:

a storage device for storing program code corresponding to a process; and a processor coupled to the storage device, for processing the program code to execute the process;

wherein the process comprises:

receiving a cell change order message from a source cell of a first radio access technology (RAT);

in response to the receiving, performing a cell change order procedure from the source cell of the first RAT to a target cell of a second RAT;

performing a radio resource control (RRC) connection establishment procedure when selecting the target cell of the second RAT;

receiving system information including access barring information of the target cell of the second radio access technology, from the target cell of the second radio access technology, wherein the access barring information indicates that the RRC connection establishment procedure is barred;

determining access barring according to the access barring information;

determining that the cell change order procedure is failed when the target cell of the second RAT is selected and the RRC connection establishment procedure is failed due to the access barring;

selecting to the source cell after determining that the cell change order procedure is failed; and sending a cell change order failure message to the source cell.

6. The communication device of claim 5, wherein the process further comprises determining that the cell change order is failed when a RRC CONNECTION REJECT message of the RRC, an abbreviation of radio resource control, connection establishment procedure is received.

7. The communication device of claim 5, wherein cell change order failure message includes failure information indicating that the failure of the cell change order procedure is caused by the access barring.

8. The communication device of claim 5, wherein the process further comprises determining that the cell change order procedure is complete when a RRC CONNECTION SETUP message from the target cell is received.

\* \* \* \* \*